United States Patent [19]

Moffett

[11] 4,318,384

[45] Mar. 9, 1982

[54] FUEL VAPORIZER

[76] Inventor: Charles M. Moffett, 2910 W. Michigan, Midland, Tex. 79701

[21] Appl. No.: 29,822

[22] Filed: Apr. 13, 1979

[51] Int. Cl.³ .......................................... F02M 31/00
[52] U.S. Cl. ...................................... 123/557; 123/549
[58] Field of Search ........... 123/122 A, 122 F, 122 E, 123/133, 557, 547, 545, 549, 558; 165/51, 52; 261/142

[56] References Cited

U.S. PATENT DOCUMENTS

| 916,003 | 3/1909 | Osborn | 123/122 E |
|---|---|---|---|
| 1,157,189 | 10/1915 | Snyder | 165/52 |
| 1,271,143 | 7/1918 | Douaud | 165/52 |
| 1,292,653 | 1/1919 | Saul | 123/557 |
| 1,597,060 | 8/1926 | Crossley | 123/557 |
| 2,047,080 | 7/1936 | Maniscalco | 165/52 |
| 3,472,214 | 10/1969 | Moon | 123/122 E |
| 3,762,385 | 10/1973 | Hollnagel | 123/546 |
| 3,783,841 | 1/1974 | Hirschler | 123/122 E |
| 3,855,980 | 12/1974 | Weisz | 123/122 E |
| 4,044,742 | 8/1977 | Linder | 123/122 E |
| 4,099,501 | 7/1978 | Fairbanks | 123/133 |
| 4,100,899 | 7/1978 | Chilton | 123/546 |
| 4,208,996 | 6/1980 | Lancaster | 123/557 |

Primary Examiner—Ronald H. Lazarus
Attorney, Agent, or Firm—Pravel, Gambrell, Hewitt, Kirk, Kimball & Dodge

[57] ABSTRACT

A fuel vaporizing apparatus adapted for supplying fuel to an internal combustion engine. The apparatus comprises a housing with an enclosed vaporizing cavity shaped to provide a relatively thin flow path and a relatively large surface area for heat transfer to maximize fuel contact with the heated surfaces of the housing, and a means for heating the cavity to vaporize the fuel.

1 Claim, 7 Drawing Figures

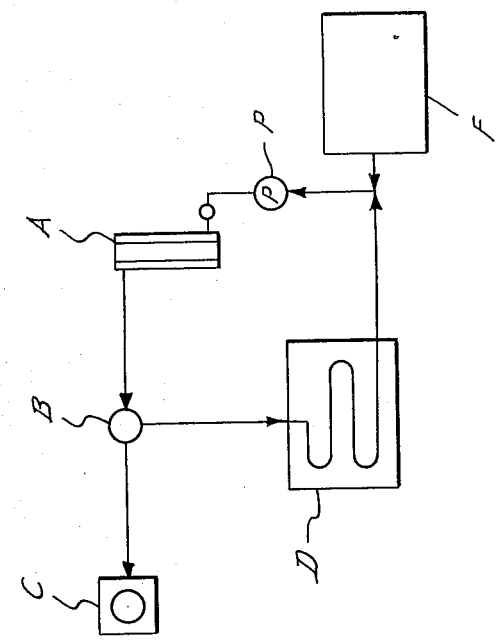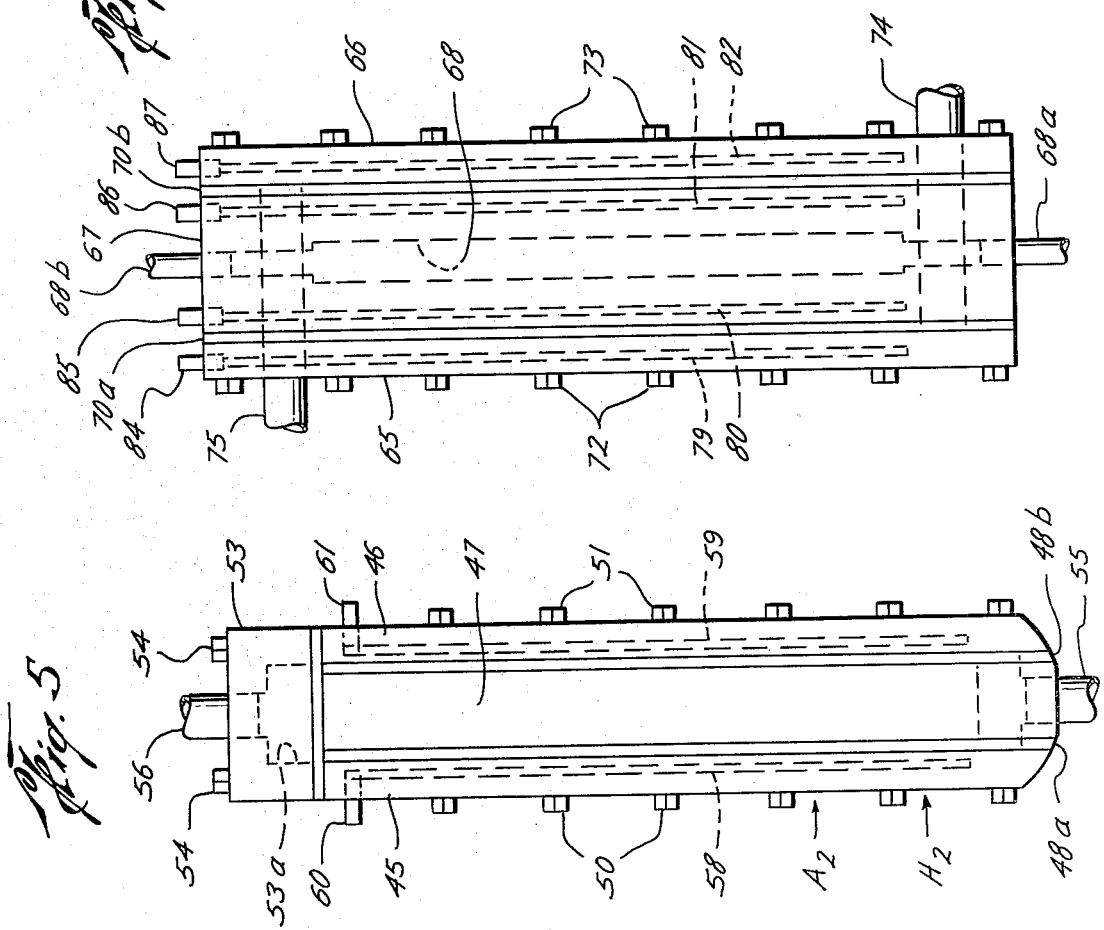

FUEL VAPORIZER

TECHNICAL FIELD OF THE INVENTION

The present invention relates to a fuel vaporizing apparatus of relative compact size for use with an internal combustion engine. Hydrocarbon fuel is vaporized in a cavity of the apparatus, which, although quite thin, has a relatively large heat transfer surface area.

PRIOR ART

Various apparatus have been devised in the past for preheating fuels before combustion to improve engine efficiency. These devices normally channel fuel down heated tubes for preheating before combustion. Tubular heating systems are not as efficient as the present invention in that less surface area is available for the transfer of heat. A lack of direct contact between the heated surface area and the interior volume of the medium to be heated drastically reduces the efficiency of heat transfer. Whereas, Applicant's invention vaporizes the fuel in such thin sheets that practically all of the fuel is in direct contact with a heated surface.

A few devices of the prior art even recognize the advantage of vaporizing the fuel prior to combustion, but they fail to utilize an effective design to vaporize such hydrocarbon fuels efficiently.

U.S. Pat. Nos. 1,637,104 and 2,314,140 are representative of these devices. But the vaporizing apparatus disclosed in U.S. Pat. No. 1,637,104 involves the use of a plurality of heated longitudinal tubes, which suffer from the tubular design problem of inadequate heating surface area. There is no mention of a vaporizer design such as Applicant's, or of a design as efficient as the present invention. A greater amount of energy, in the form of heat, must be employed to vaporize the fuel because of the limited heating surface contact with the entire cross-sectional volume of fuel passing through the tubular passages. Applicant's device with relatively thin planar surface cavities and a relatively large surface area gives proximity of heat surface to the entire volume of fluid passing through the vaporizer.

The vaporizer disclosed in U.S. Pat. No. 2,314,140 employs a heating coil placed inside a cylindrical vaporizing vessel instead of heated tubular passages. This type of design is even more inefficient in its use of energy. Additionally, safety hazards are encountered when trying to vaporize hydrocarbon fuels in bulk volumes. A volatile fuel, such as gasoline, when vaporized in bulk quantities, can be extremely dangerous. It is ideal to vaporize small volumes of fuel at one time in the fuel line itself.

U.S. Pat. No. 3,509,859 discloses a fuel atomizing and heating apparatus for use with internal combustion engines. This method also utilizes heating coils inside a cylindrical unit and thus, suffers from the problems attendant with bulk heating of volatile fuels. In addition, the above-described patent has as its objective a mere preheating of fuel, rather than a vaporization. The fuel is specifically pressured to keep vaporization from occurring before being sprayed into the carburetor throat.

U.S. Pat. Nos. 2,851,027 and 3,472,214 both utilize a tubular heating system to preheat hydrocarbon fuels for engine use. Both apparatus suffer from the above-mentioned problem associated with tubular systems of an inadequate heating surface area to quickly and efficiently vaporize fuels. Neither device is designed for vaporizing fuel, but rather for preheating fuel. Additionally, the purpose of U.S. Pat. No. 2,851,027 is to heat propane fuel to use only as a starting aid for an automobile engine in cold weather. The apparatus is not designed for normal operation.

Other examples of fuel heating devices are disclosed in U.S. Pat. Nos. 3,635,200 and 4,041,591.

SUMMARY OF THE INVENTION

The use of the present invention will significantly increase the operating efficiency of an internal combustion engine by vaporizing its fuel in a quick and efficient manner. The fuel vaporizer consists of a housing with a fuel inlet and a fuel outlet communicating with an enclosed cavity, such cavity shaped to provide a relatively thin flow path of less than 0.5 millimeters, preferably 0.025 to 0.125 millimeters, and a relatively large heat transfer surface area. Heat is supplied to the fuel vaporizing cavity by any of several means. Electrical heating elements may be embedded in the housing or attached on the outside of the housing if the housing is constructed of a heat transmissive material. Such electrical heating elements may also be placed on the inside of the cavity. The fuel vaporizing unit can also be heated by the use of engine exhaust or engine coolant.

In the preferred embodiment, the housing is constructed by the use of two plates with a seal placed around the periphery of such plates so that an enclosed cavity will be formed between the two plates that are spaced apart a preselected distance when secured together. Liquid fuel is channeled into the cavity where it is vaporized rapidly and efficiently in the small volumes needed to fuel an internal combustion engine. Because the film of liquid fuel in the cavity between the spaced plates is so very thin, preferably 0.025 to 0.125 millimeters, it will vaporize instantly without the use of very high temperatures. Multiple cavities may be utilized in a parallel or side-by-side relationship to enable the apparatus to vaporize large quantities of fuel.

BRIEF DESCRIPTION OF THE DRAWINGS

FIG. 5 is a side elevation view showing a different embodiment of a fuel vaporizer having two cavities;

FIG. 6 is a side elevation view of the fuel vaporizer with two cavities modified to be heated by engine exhaust or coolant; and FIG. 7 is a flow chart illustrating a suggested means of employing the vaporizer with an internal combustion engine.

DETAILED DESCRIPTION

Figure 2:
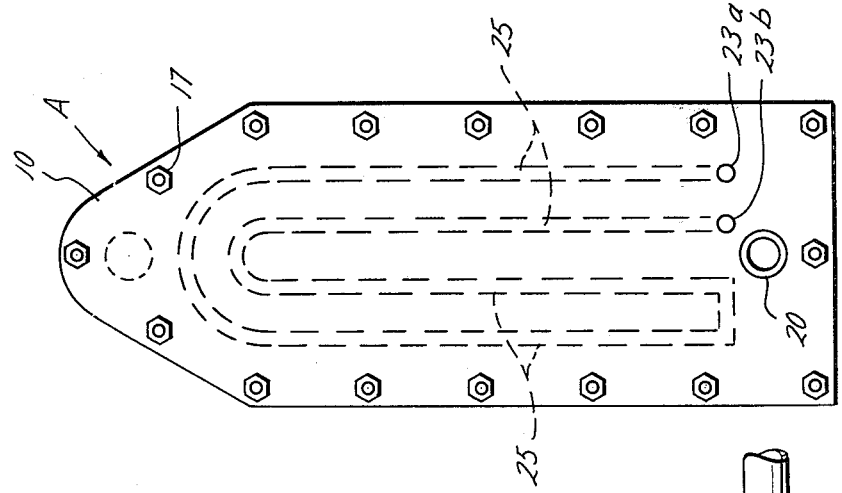
FIG. 2 is a top elevation view of the fuel vaporizer similar to FIG. 1.
Figure 1:
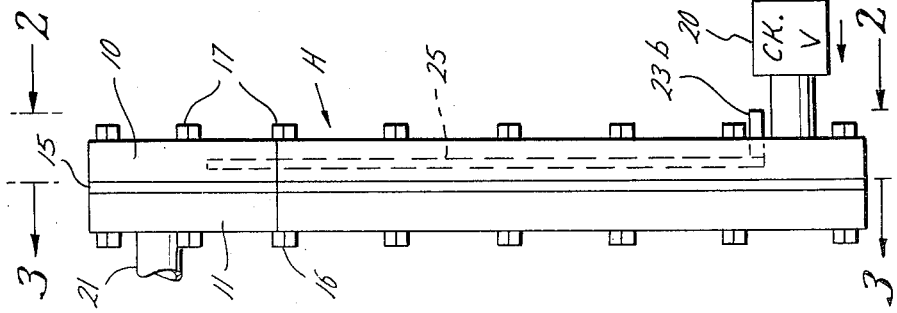
FIG. 1 is a side elevation view illustrating the fuel vaporizer with one cavity.

The fuel vaporizer apparatus, generally designated A of the present invention is illustrated in FIGS. 1 and 2, where the vaporizer apparatus A is shown in its simplest embodiment. A housing H is formed of two heat transfer panels or plates 10 and 11 which are bolted together with a plurality of spaced bolts 16 and nuts 17 in the usual manner with a solid peripheral seal 15 placed between the plates 10 and 11, to effect a predetermined spacing between the plates 10 and 11 to form a single vaporizing cavity 12. The seal 15 is selected at such desired thickness that a relatively thin planar cavity 12 is formed between the heat transfer plates 10 and 11 for the vaporization of fuel. The planar cavity spacing between plates 10 and 11 should be no thicker than 0.5 millimeters, preferably 0.025 and 0.125 millimeters which coupled with the large surface area of the two plates 10 and 11 allows for substantially instantaneous, but controlled, vaporization of liquid or semi-liquid fuels. The relatively thin cavity 12 exposes the maximum volume of fuel to the heated surfaces of the plates 10 and 11 while minimizing the requirement for internal heat transfer within the fuel.

A check or one-way fuel inlet valve 20 is attached to plate 10 to communicate the fuel inlet 20 with the vaporization cavity 12. Liquid fuel enters the fuel vaporizer apparatus A through check valve 20, is vaporized in the cavity 12, and exits the fuel A through a fuel outlet 21 which communicates with the other end of the cavity 12.

Preferably, electrical resistive heating elements 25 are embedded in plate 10 as illustrated in phantom in FIGS. 1 and 2. Electrical power supply connections 23a and 23b for the heating elements 25 are attached to plate 10 in the usual manner. FIG. 2 illustrates one suggested placement of the electrical heating elements which may be embedded in one or both plates 10 and 11 attached to the outer surface of one or both plates 10 and 11, or placed within the cavity 12. The entire unit is preferably bolted together to permit disassembly to facilitate cleaning, but other means of securing may be utilized.

Figure 3:
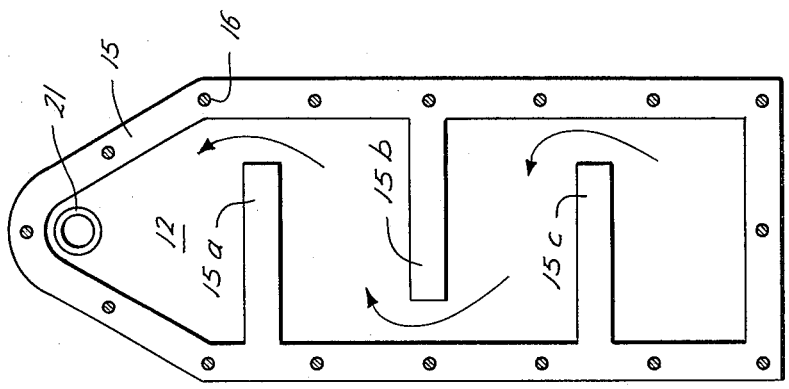
FIG. 3 is a cross-sectional top view exposing the vaporizing cavity of the vaporizer shown in FIGS. 1 and 2.

FIG. 3 illustrates a cross-sectional view of the interior of the vaporizing cavity 12 with optional baffles 15a, 15b and 15c of the spacing and sealing member 15 extending into the cavity 12 to increase the residence time of fuel in the cavity 12. The advantages of using baffles 15a, 15b and 15c to reduce the size of the apparatus A is well known to those skilled in the art and need not be repeated herein.

Figure 4:
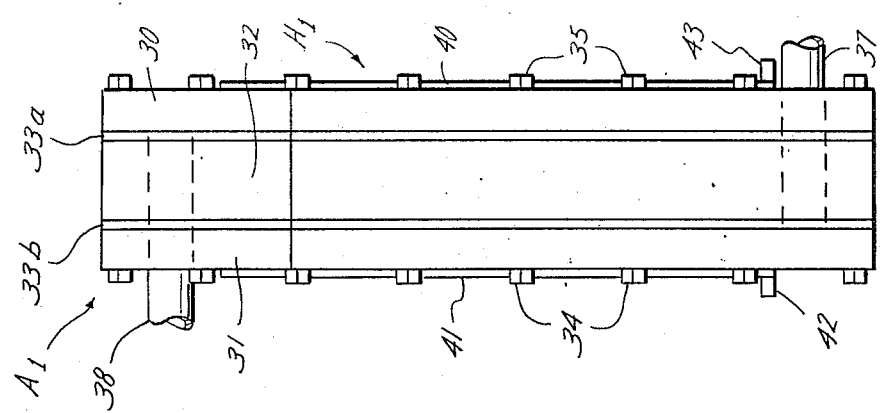
FIG. 4 is a side elevation view, partially in section, illustrating the housing of a fuel vaporizer having two cavities.

FIG. 4 illustrates another embodiment of the fuel vaporizer apparatus A1 having a housing H1 formed by two plates 30 and 31 surrounding a center panel or plate 32 with peripheral seals 33a and 33b placed on opposite sides of the center heat transfer plate 33 for achieving the desired chamber forming spacing from the outer plates 30 and 31 in a manner similar to that of peripheral sealing member 15 of FIG. 1. A plurality of bolts 34 and nuts 35 are used to fasten the assembly together to facilitate disassembly for cleaning purposes in a manner similar to that of FIG. 1. It is desirable that the inner surfaces of the plates 30 and 31, and both surfaces of the center plate 32 be finely polished in order to offer minimum resistance to fuel flow within the cavities. The center panel 32 may also be composed of an insulated material with two metal-plated surfaces.

As illustrated in FIG. 4, the sealing member 33a forms a first vaporizing chamber (not illustrated) between plates 30 and 32 while sealing member 33b forms a companion second vaporizing chamber (not illustrated) between plates 31 and 32. A fuel check valve inlet 37 communicates with a lower end of both of the vaporizing chambers while a fuel outlet 38 communicates with the upper end of both vaporizing chambers. Various baffle arrangements (not illustrated) may also be utilized with this embodiment.

In the embodiment of FIG. 4, electrical resistive heating elements 40 and 41 are preferably secured to the heat transfer plates 30 and 31, but may be embedded in the plates 30 and 31 as illustrated in FIGS. 1 and 2. Electrical connections 42 and 43 are attached to the exterior of plates 30 and 31 for connecting with a source of electrical energy to heat plates 30 and 31. Plate 32 may also be provided with such heating means if desired, but even without such means it will still serve as a heat transfer panel at operating temperatures.

FIG. 5 illustrates a third embodiment of the fuel vaporizer apparatus A2 in which housing H2 forms multiple vaporization cavities created by the use of stacked plates 45, 46, and 47, and spacing peripheral seals 48a and 48b in a manner similar to that illustrated in FIG. 4. A plurality of bolts 50 and nuts 51 are used to secure the assembly A2 in the manner previously described. The fuel check valve inlet 55 is also communicated into the multiple cavities to be vaporized while an outlet cap 53 is secured to the plates 45 and 46 by a plurality of threaded bolts 54 in the usual manner. The cap 53 is provided with an internal recess 53a communicating with the plurality of vaporizing chambers and with a fuel outlet connection 56.

Electrical energy means may also be used in the embodiment of FIG. 5 to effect vaporization of the fuel. Electrical resistance heating elements 58 and 59, shown in phantom, are embedded in plates 45 and 46 while electrical connections 60 and 61 can be placed at any accessible location on the exterior of the fuel vaporizer assembly A2. As mentioned previously, the interior surfaces of plates 45 and 46 and the surfaces of center plate 47 should be highly polished to minimize resistance to flow of fuel in the vaporizing cavities. Alternatively, a housing of substantially one-piece construction can be utilized instead of the above-mentioned multiple plate assembly. The alternative, however, may exacerbate cleaning problems.

Fuel vaporizing heat can be supplied to the fuel vaporizing apparatus A by means other than electrical heating elements. Engine exhaust or engine coolant is a source of waste heat from an internal combustion engine that may be utilized as a source of fuel vaporization energy. Such heat is relatively free in terms of cost, but is more difficult than electrical heating elements to adequately control especially during engine start up and initial engine operation. FIG. 6 illustrates an embodiment, which is heated by a combination of both waste engine heat and electrical heating elements.

As illustrated in FIG. 6, this embodiment employs the housing H formed of two stacked outer plates 65 and 66 and a center plate 67 to create two parallel vaporization cavities by the use of seals 70a and 70b. The entire assembly is secured together in the stacked condition by the plurality of bolts 72 secured with nuts 73. A fuel inlet check valve 74 communicates fuel from the fuel source to the two vaporizing cavities while a fuel outlet 75 communicates with both vaporization cavities to receive vapor from both cavities.

The center plate 67 contains a large internal chamber 68 having a fluid inlet 68a and fluid outlet 68b for the relatively high temperature fluid from the engine. Inlet 68a communicates with the heating chamber 68 to supply fluid of relatively high temperature or energy level, such as, exhaust emissions or engine coolant into the heating chamber 68. An outlet 68b is also illustrated at the top of the heating chamber 68, but it should be understood that flow through the chamber 68 may be in the opposite direction than that previously described.

Besides employing exhaust emissions or engine coolant to heat the fuel vaporizing cavities, electrical heating elements are also preferably employed in this embodiment. These heating elements shown in phantom as 79, 80, 81 and 82 are embedded in plates 65, 66, and center bar 67. Electrical connection posts 84, 85, 86 and 87 are provided at the top of the assembly in this embodiment. Alternatively, the heating elements can be placed in the plates so as to provide direct contact between the heating elements and the fuel to be vaporized. Additionally, it should be noted that multiple heating elements are not essential in the present invention. Because of the relatively thin vaporizing cavities provided with a relatively large surface area, fuel can be vaporized almost as easily by heating only one plate.

OPERATION OF THE PRESENT INVENTION

A typical installation of the apparatus A of the present invention is illustrated in FIG. 7. A fuel pump P provides fuel to the fuel inlet of the vaporizing apparatus A at a desired rate to enhance vaporization therein. The rate of flow is subject to the capacity of the apparatus A which are controlled by the dimensions of the vaporizing cavities in the fuel vaporizer, the temperature utilized to vaporize the fuel, the chemical properties of the fuel and the volume of fuel needed for the required performance. A low-pressure regulator B is preferably located in the fuel line between the outlet of the fuel vaporizer A and the carburetor C to control the quantity of fuel vapor supplied to the carburetor C. Excess fuel vapors are directed by the vapor regulator B through a heat exchanger D which cools the fuel vapor back to a liquid state for recycling and storage in the fuel tank F.

Known carburetors designed with a dual set of fuel circuits could also be employed instead of the above embodiment. One fuel circuit is designed for normally liquid fuel, while the other is employed for a vaporous feed. A dual set of fuel pumps feeds the liquid fuel system and the vaporizer. When the vaporization reaches the desired level, sensors terminate the liquid fuel flow to the normally liquid fuel circuit in the carburetor which prevents the venturi of the carburetor from vaporizing liquid fuel by the normal fuel circuit.

The foregoing disclosure and description of the invention are illustrative and explanatory thereof, and various changes in the size, shape and materials as well as in the details of the illustrated embodiments may be made without departing from the spirit of the invention.

I claim:

1. A fuel vaporizing apparatus adapted for supplying normally liquid fuel to an internal combustion engine in a vapor form, including:

a housing forming an enclosed cavity and having a fuel inlet at one end of said cavity and a fuel outlet at the other end of said cavity, said housing having a first heat transfer panel and a second heat transfer panel spaced apart a small uniform preselected distance for forming a cavity with dimensions for producing a thin film of fuel to minimize any heat transfer within the fuel itself and to maximize heat transfer fuel contact with said heat transfer panels as the fuel flows in said cavity from said fuel inlet to said fuel outlet;

means for peripherally sealing between said spaced panels for enclosing said cavity to controllably contain the film of fuel in said cavity;

heating means operably secured in the heat transfer relationship with at least one of said first and second heat transfer panels for increasing the temperature of said panels to effect desired heat transfer whereby the thin film of fuel is increased in temperature to a more desirable operating temperature for subsequent vaporization in the carburetor of the internal combustion engine, said heating means having an electrical resistance element embedded in one of said heat transfer panels for converting electrical energy into heat to increase the temperature of said heat transfer panel by electrical operation of said electrical resistant element; and means for supplying electrical energy to said electrical resistance heating means to provide suitable heat for vaporizing the fuel.

* * * * *